April 24, 1951 F. L. FISH 2,549,898
SLIDE CHANGING DEVICE FOR PROJECTORS
Filed Nov. 15, 1949 3 Sheets-Sheet 1

INVENTOR,
Frank L. Fish
BY Henry Molz
ATTORNEY.

April 24, 1951 F. L. FISH 2,549,898
SLIDE CHANGING DEVICE FOR PROJECTORS
Filed Nov. 15, 1949 3 Sheets-Sheet 2
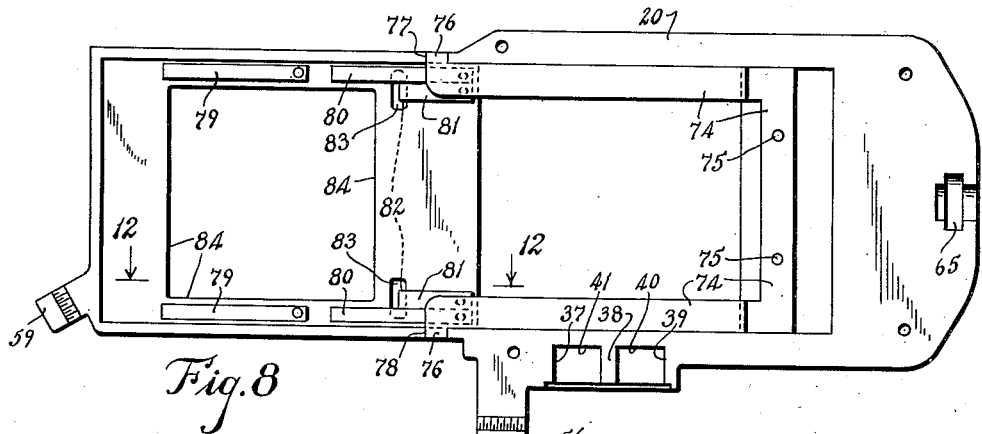
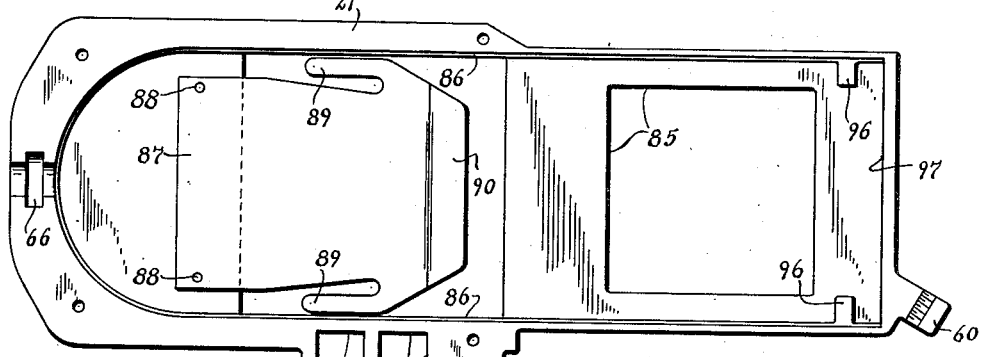
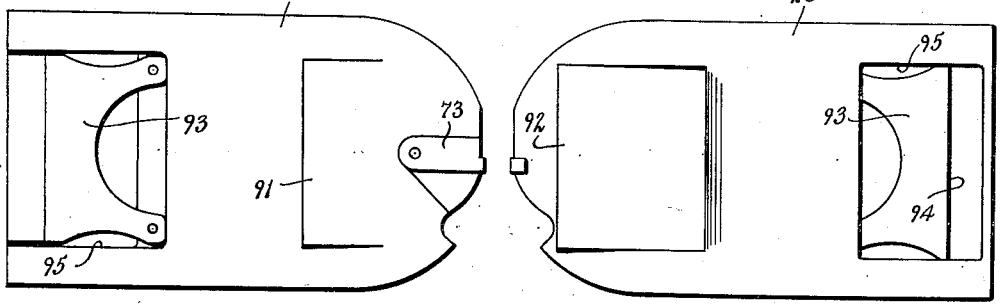
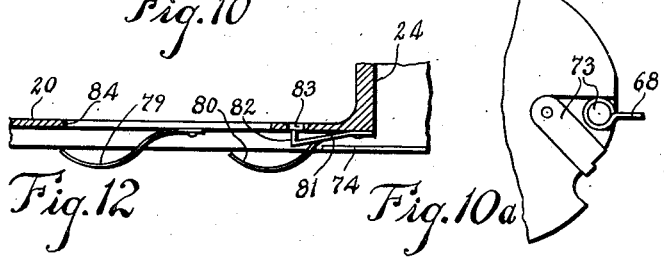
INVENTOR,
Frank L. Fish
BY Harry Molz
ATTORNEY.

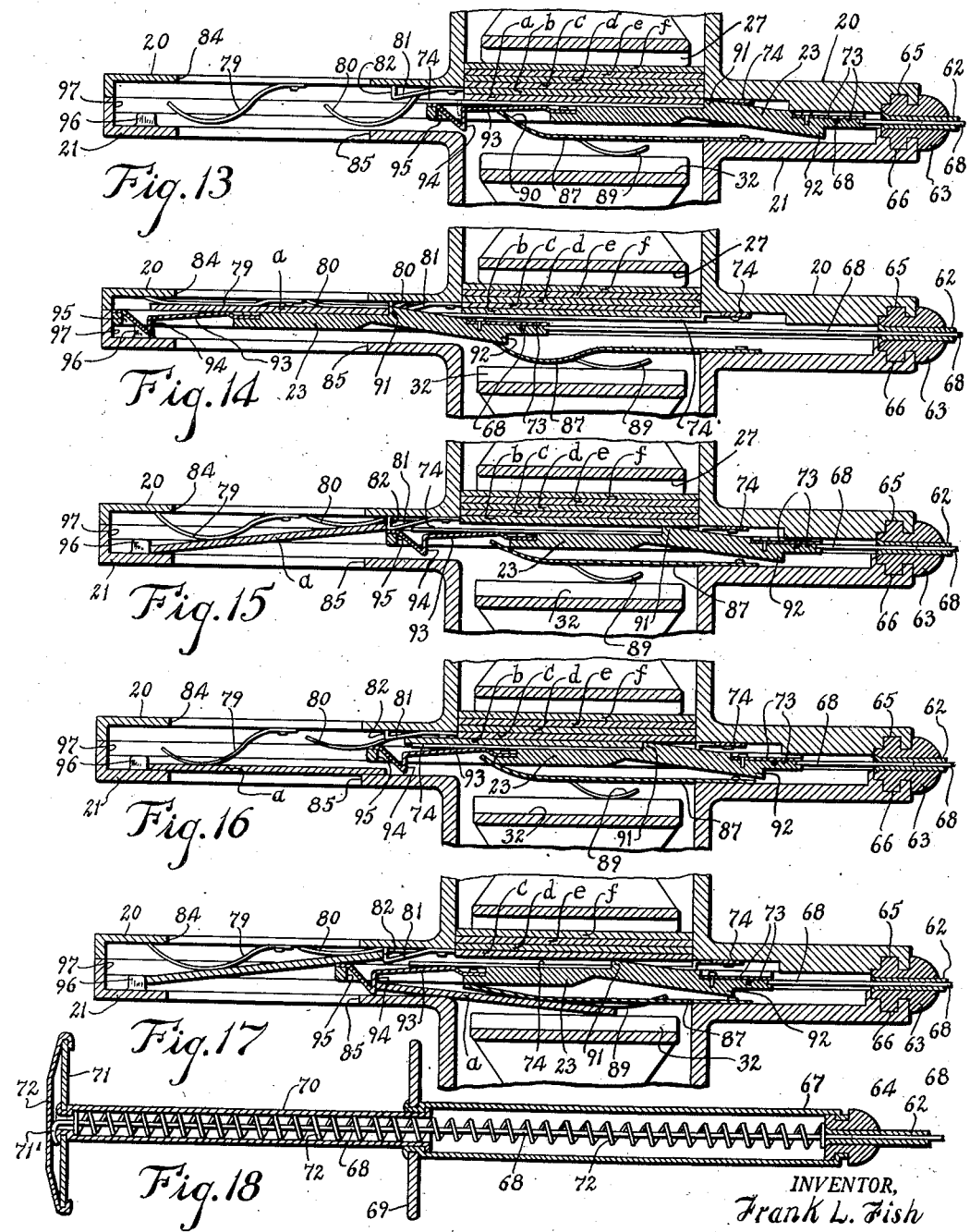

Patented Apr. 24, 1951

2,549,898

UNITED STATES PATENT OFFICE 2,549,898

SLIDE CHANGING DEVICE FOR PROJECTORS

Frank L. Fish, Los Angeles, Calif.

Application November 15, 1949, Serial No. 127,293

2 Claims. (Cl. 88—28)

The primary object of my device is to provide a slide changer for conveying at will from a stack of slides placed in operating sequence to a slide projector, the respective slides in consecutive order as stacked for projection through the projector;

A further object of my invention is to provide a device of said character which will correctly center and properly bring into the focal plane of the projector each slide in its selected order of sequence, and thereafter carry it outwardly and away therefrom in restacked order, ready for replacement and reprojection as in the first instance;

A still further object of my invention is to provide a device of said character which will convey each slide into and out of focus with the projector free from scratches, and fingerprints during the conveying movement, and simultaneously therewith move the succeeding slide in positive position for projecting;

A still further object of my invention is the provision of a device of said character which will convey and aline the slide for projection in a single smooth operating movement so as to show the full beauty and illusion of depth of the picture brought to view;

And a still further object of my invention and a highly important one, is that the operator of the projector in manipulating the remote control button may devote full time and attention to the screen without regard or concern to the operation of my device. This dependence upon the operation of the device is impossible with other slide changers in use, and wherewith the projection machine operator must divide his time and attention first on the operation of the changer and thereafter to the screen as he handles each slide in turn, said practice as is carried on in the usually unlighted projection booth frequently resulting both in finger smeared prints and up-side-down pictures. My device positively eliminates each of said highly undesirable results.

Other objects and specific advantages of the invention over the existing art will appear from the following description and accompanying drawings, in which:

Figure 8 is an inside elevation of a part of the slide changer as indicated by arrow 8 of Fig. 3;

Figure 9 is an inside elevation of a part of the slide changer as indicated by arrow 9 of Fig. 3;

Figure 10 is an elevation of that side of a slide mover or shuttle positioned adjacent to Fig. 8;

Figure 10a is a fragmentary elevation similar to Fig. 10, and showing a cable latch in open position;

Figure 11 is an elevation of that side of a slide mover or shuttle positioned adjacent to Fig. 9;

Figure 12 is a section on line 12—12 of Fig. 8;

Figure 1:
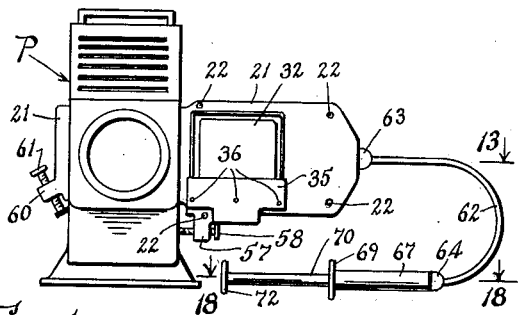
Figure 1 is a front elevation of a projector carrying the slide changer.
Figure 2:
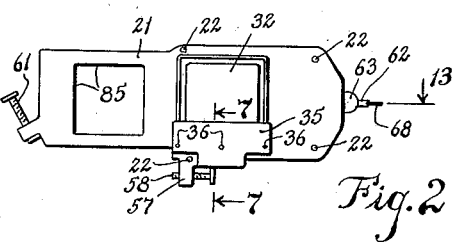
Figure 2 is a front elevation of the slide changer.
Figure 3:
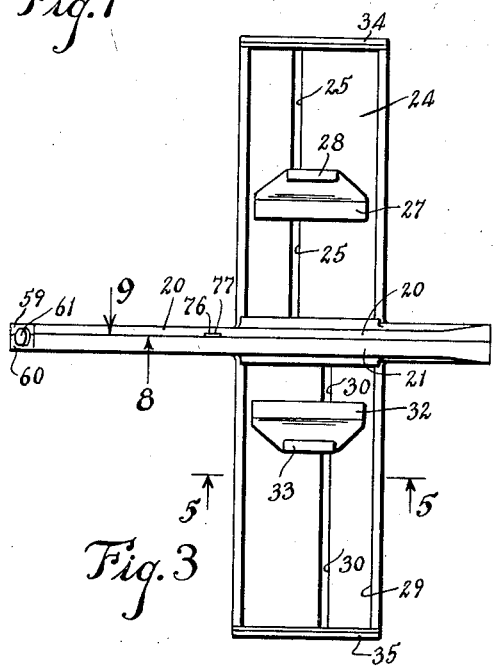
Figure 3 is a top plan view of the slide changer on a larger scale.
Figure 4:
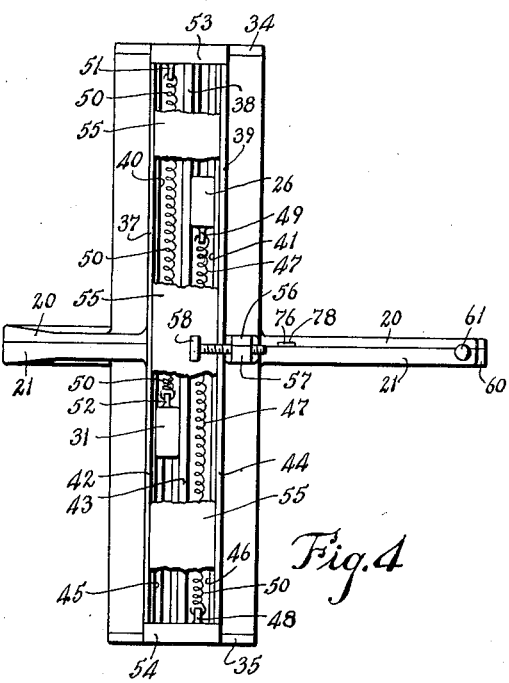
Figure 4 is a bottom plan view of Fig. 3 with the bottom plate partly broken away.
Figure 5:
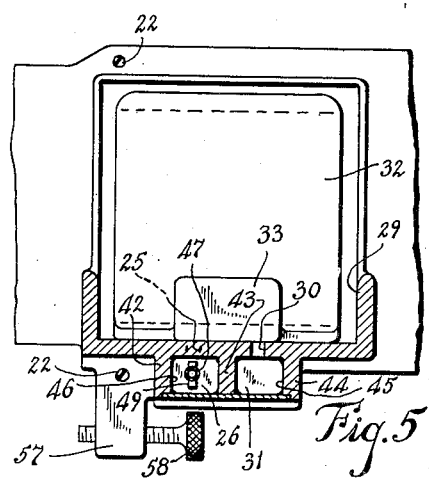
Figure 5 is a section on line 5—5 of Fig. 3.
Figure 6:
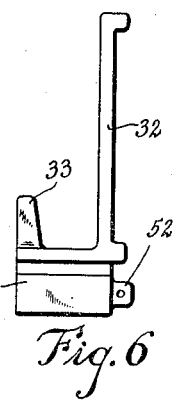
Figure 6 is a side elevation of an unassembled slide follower.
Figure 7:
Figure 7 is a fragmentary section on line 7—7 of Fig. 2.

Figures 13 to 17 inclusive are sections taken on line 13—13 of Figure 2, each, however, indicating in succession, the progressive movement of the slides through the changer, and Figure 18 is a section taken on line 18—18 of Fig. 1;

Similar numerals and letters of reference indicate like parts throughout the several views.

Embodied in the slide changer are two main castings 20 and 21 respectively attached to one another by means of screws or the like 22, and enveloping a slide shuttle 23.

The casting 20 embodies a slide feed trough 24 provided in its bottom with a slot 25 for the mounting of an inverted T-shaped lug 26 formed on the bottom of a slide follower 27 having a finger grip 28.

The casting 21 also embodies a slide trough 29 provided in its bottom with a slot 30 for mounting an inverted T-shaped lug 31 formed on the bottom of a slide follower 32 having a finger grip 33.

The outer ends of the trough 24 and trough 29 are closed respectively by end plates 34 and 35 secured thereto by counter sunk screws 36.

The under side of the trough 24 is provided with depending ribs 37, 38 and 39 whereby forming channels 40 and 41, respectively.

The under side of the trough 29 is also provided with depending ribs 42, 43 and 44 whereby forming channels 45 and 46, respectively.

The channel 40 is aligned with the channel 45, and the channel 41 is aligned with the channel 46.

The lug 26 is positioned to slide longitudinally in the channel 41 and is urged toward the center of the slide changer by a spring 47 attached at one end to a lug 48 formed on the end plate 35, and at its other end to a lug 49 formed on the lug 26.

The lug 31 is positioned to slide longitudinally in the channel 45 and is urged toward the center of the slide changer by a spring 50 fastened at one end to a lug 51 formed on the end plate 34 and at the other end to a lug 52 formed on the lug 31.

Horizontally disclosed portions 53 and 54 of the respective end plates 34 and 35 underlie and secure a bottom plate 55 which closes the channels 40, 41, 45 and 46.

The castings 20 and 21 are each provided on the bottom with lugs 56 and 57 assembled to form a threaded mounting for a set screw 58. Additionally to the lugs 56 and 57, lugs 59 and 60 are provided on said castings 20 and 21. They are likewise assembled to provide a mounting means for a set screw 61.

A flexible armor tube 62 is secured at its respective ends in mounting buttons 63 and 64.

The castings 20 and 21 are further provided at one edge with grooves 65 and 66 which clamp about the button 63 to secure it to the slide carrier. Button 64 is similarly held by crimping in the end of a tube like operating handle 67.

A stiff wire cable 68 is slidably positioned within the armor tube 62.

The handle 67 is provided at its end opposite the button 64 with a disc like finger grip 69.

A hollow plunger 70 telescopes into the handle 67 and is provided at its outer end with a disc 71 similar to the grip 69. The disc 71 may be furnished with a covering 72.

One end of the cable 68 extends through the handle 67 and the plunger 70. It is secured to the disc 71 at 71'.

A coiled spring 72 is positioned about the cable 68 within the handle 67 and the plunger 70.

The other end of the cable 68 extends into the slide changer and is secured to the shuttle 23 by a pin and a latch 73.

A bifurcated thin sheet metal combination slide and shuttle guide 74 is secured at one end within the casting 20 by rivets 75.

An outwardly turned toe 76 is formed on each of the bifurcated ends of the guide 74 and clamped between the castings 20 and 21 within grooves 77 and 78 formed in the casting 20.

Small leaf springs 79—79, 80—80, and 81—81 are riveted within the casting 20 along the path of the slides, a, b, c, d, e and f.

The springs 81—81 are provided with right angular ends 82—82, positioned to be depressed into openings 83—83 provided in the casting 20.

The castings 20 and 21 are further provided with large openings 84 and 85 respectively to permit the passage of a light beam from the projector through the slides.

The shuttle 23 slides upon the shoulder 86 formed within the casting 21. A large leaf spring 87 is secured by rivets 88 at one end within said casting 21 along the path of the shuttle 23 and is cut along two of its edges to form a pair of spring ears 89—89 integral with, but more flexible than the main body of the spring 87. The free end 90 of the spring 87 is bent at a slight angle toward the casting 20.

A shoulder 91 is formed on the shuttle 23 to engage and move the slides into position to be projected. An inclined portion 92 of the shuttle cooperating with the spring 87.

A leaf spring arm 93 is riveted at one end to one side of the shuttle 23. It is provided with an angular bent shoulder portion 94 extending through an opening 95 in the shuttle 23 and serves as a hook.

The slides a, b, c, d, e and f disclosed in Fig. 13 are shown as standing on edge in the trough 24 with the follower 27 holding them against the guide 74.

The trough 24 constitutes a feed magazine from which the slides are moved into the frame portion of the device which is disposed in the projector for holding the slides in position to be exhibited. This frame portion and adjoining portions thereof formed by the castings 20 and 21 act as a guide for the shuttle and the slides which latter after being exhibited through the projector are retracted and stored in the trough 29 which serves as a magazine to collect the slides in the same order as originally stacked in the feed magazine trough 24.

In depicting the progressive movement of the slides, Figure 14 shows the shuttle 23 moved toward the left by the cable 68 under the impulse of the plunger 70 which is manually operated, the slide a having been moved or pushed by the shoulder 91 into the position shown.

In Fig. 15, the plunger 70 has been released and the spring 72 has withdrawn the shuttle 23. The spring ends 82—82, however, prevent the slide a from returning with the shuttle, being depressed by the slide a into the openings 83—83 just prior to the position slide a has reached in Fig. 14. The slide a in Fig. 15 is being snapped down and into the position shown in Fig. 16 by the action of the springs 79 and 80. This Fig. 16 position of the slide a is reached when the shuttle 23 moves to the right clear of the slide just before the shuttle reaches its normal position shown in Fig. 13.

In Fig. 16 the shuttle is shown as on its second operation with the second slide b picked up and being moved to the left. When the shuttle 23 has continued its second movement toward the left from the Fig. 16 position to the position shown in Fig. 14, the shoulder 94 overrides the slide a and snaps down over the left end thereof so as to draw the latter to the position shown in Fig. 17. It will continue this progressive movement but to the right following its movement as disclosed in Fig. 17, and until the spring 87 with its ears 89 has pushed the slide a down against the follower 32 and the slide b in turn is thereupon automatically positioned as is the slide a shown in Fig. 16.

The slides are picked up by the shuttle 23 from the trough 24, moved into the path of the light beam from the projector P as is the slide a in Fig. 16 and then moved into the trough 29 as indicated by the movement disclosed in Fig. 17.

Leftward movement of the slides is limited by a pair of lugs 96—96 formed within the casting 21. Leftward movement of the shuttle 23 is limited by the end wall 97 of the casting 21.

The set screws 58 and 61 permit adjustment of the slide changer in its relation to the lens of the projector.

The simplicity and durability of the device as herein disclosed for the attainment of the foregoing functional characteristics in an automatic progressive step by step movement of the slides, marks for a distinct advantage in the art, to the end that the projector operator can devote full attention thereto without concern as to the slide movement in the process of exhibiting the slides in their proper order of sequence and uprighted as required.

I am aware that slight modifications may from time to time readily suggest themselves without departing, however, from the scope of the present invention, and as defined in the claims appended hereto. Hence, I do not limit my present invention to the exact description and structural embodiment herein disclosed, but what I do claim is:

1. In a mechanism for operating a slide changing device for attachment to a slide projector wherein the device includes a feed magazine for slides to be exhibited, a receiver magazine for collecting the slides after exhibition thereof, and a frame associated with said magazines and serving as a guide for the slides in the movement thereof from the feed magazine into position to be exhibited and thence into the receiver magazine; the improvement which includes an elongated plate-like shuttle reciprocable in the frame between said magazines, a shoulder intermediate the ends of said shuttle for engaging an end of a slide in the feed magazine and moving the slide on the shuttle into a position in the frame to be exhibited, spring means on the frame for moving the slide to one side of the plane of movement of the shuttle on retraction of the shuttle from position in which the slide is to be exhibited, said shuttle having an opening adjacent one end thereof, a spring arm fixed at one end on said shuttle and having its free end disposed in said opening and of angular form to serve as a hook for engaging and retracting the slides after exhibition thereof, spring means in the frame contacting said spring arm when the shuttle is retracted and contacting the shuttle while the latter is in motion for urging the shuttle toward the feed magazine, said last named spring means guiding the retracted slides into the receiver magazine, means for reciprocating said shuttle, and a pair of shuttle guide members fixed at their ends to the frame and extending between the shuttle and the feed magazine in contact with the shuttle and spaced apart to permit the slides to pass therebetween against the shuttle.

2. In a mechanism for operating a slide changing device for attachment to a slide projector wherein the device includes a feed magazine for slides to be exhibited, a receiver magazine for collecting the slides after exhibition thereof, and a frame associated with said magazines and serving as a guide for the slides in the movement thereof from the feed magazine into position to be exhibited and thence into the receiver magazine; the improvement which includes an elongated plate-like shuttle reciprocable in the frame between said magazines, a shoulder intermediate the ends of said shuttle for engaging an end of a slide in the feed magazine and moving the slide on the shuttle into a position in the frame so as to be exhibited, spring means on the frame for moving the slide to one side of the plane of movement of the shuttle on retraction of the shuttle from the position in which the slide is to be exhibited, said shuttle having an opening adjacent one end thereof, a spring arm fixed at one end on said shuttle and having its free end disposed in said opening and being angular in form to serve as a hook for engaging and retracting the slides after exhibition thereof, dual spring means in the frame for urging the shuttle toward the feed magazine and guiding the retracted slides into the receiver magazine, and means for reciprocating said shuttle, said dual spring means having one portion extending into said opening and contacting the spring arm when the shuttle is retracted, and contacting the shuttle while in motion; the other portion of said dual spring means urging the retracted slide into the receiver magazine.

FRANK L. FISH.

REFERENCES CITED

The following references are of record in the file of this patent:

UNITED STATES PATENTS

| Number | Name | Date |
| --- | --- | --- |
| 1,159,681 | Kastner | Nov. 9, 1915 |
| 2,213,779 | Young | Sept. 3, 1940 |
| 2,434,785 | Blumenstein | Jan. 20, 1948 |
| 2,482,117 | Leas | Sept. 20, 1949 |